(12) United States Patent
Al-Dahhan et al.

(10) Patent No.: US 9,764,612 B2
(45) Date of Patent: Sep. 19, 2017

(54) DAMPER

(71) Applicant: BASF SE, Ludwigshafen (DE)

(72) Inventors: Sadiq Al-Dahhan, Dearborn, MI (US); Albert Langen, Canton, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/433,290

(22) PCT Filed: Oct. 2, 2013

(86) PCT No.: PCT/US2013/062983
§ 371 (c)(1),
(2) Date: Apr. 2, 2015

(87) PCT Pub. No.: WO2014/055599
PCT Pub. Date: Apr. 10, 2014

(65) Prior Publication Data
US 2015/0239315 A1    Aug. 27, 2015

Related U.S. Application Data

(60) Provisional application No. 61/708,738, filed on Oct. 2, 2012, provisional application No. 61/792,595, filed on Mar. 15, 2013.

(51) Int. Cl.
*B60G 11/22*      (2006.01)
*F16F 1/377*      (2006.01)
*F16F 3/093*      (2006.01)

(52) U.S. Cl.
CPC .............. *B60G 11/22* (2013.01); *F16F 1/377* (2013.01); *F16F 3/093* (2013.01);
(Continued)

(58) Field of Classification Search
CPC combination set(s) only.
See application file for complete search history.

(56) References Cited

U.S. PATENT DOCUMENTS 2,888,258 A    5/1959   Hoffstrom
3,409,284 A *  11/1968  Rix ...................... F16F 1/3732
                                                    267/153

(Continued)

FOREIGN PATENT DOCUMENTS

CN    2748698 Y    12/2005
CN    1789028 A    6/2006
(Continued)

OTHER PUBLICATIONS

English language abstract and machine-assisted English translation for CN 2748698 extracted from espacenet.com database on Apr. 14, 2016, 5 pages.
(Continued)

*Primary Examiner* — Darlene P Condra
(74) *Attorney, Agent, or Firm* — Howard & Howard Attorneys PLLC (57) ABSTRACT

A damper absorbs energy generated between a first component and a second component. The second component is spaced from and moveable toward the first component along a jounce axis. The damper includes a body having a ring-shaped configuration. The body also includes a first edge for engaging the first component and a second edge for engaging the second component. The second edge is spaced from the first edge. The body defines a plurality of holes spaced about the body. The plurality of holes are configured to allow the damper to compress axially for energy as one of the first and second components move along the jounce axis.

17 Claims, 13 Drawing Sheets

(52) U.S. Cl.
CPC .... *B60G 2202/143* (2013.01); *B60G 2500/20* (2013.01); *F16F 2224/025* (2013.01); *F16F 2236/04* (2013.01)

(56) References Cited

U.S. PATENT DOCUMENTS

| | | | | |
|---|---|---|---|---|
| 3,606,295 | A * | 9/1971 | Appleton | B60G 11/22 105/198.7 |
| 4,191,398 | A * | 3/1980 | Willetts | B60G 5/04 267/35 |
| 4,194,255 | A * | 3/1980 | Poppe | A47C 27/065 267/153 |
| 4,858,897 | A | 8/1989 | Irifune | |
| 5,014,967 | A * | 5/1991 | Wolf | F16F 1/377 267/145 |
| 5,409,199 | A * | 4/1995 | Kahmann | B29C 33/48 114/220 |
| 5,467,970 | A * | 11/1995 | Ratu | B60G 7/04 267/152 |
| 5,467,971 | A * | 11/1995 | Hurtubise | B60G 15/068 188/322.12 |
| 5,632,504 | A * | 5/1997 | Gallagher | B60G 9/02 280/124.116 |
| 6,059,163 | A * | 5/2000 | Pfister | B25C 1/14 173/211 |
| 6,251,493 | B1 * | 6/2001 | Johnson | F16F 1/37 428/220 |
| 6,254,072 | B1 | 7/2001 | Bono et al. | |
| 6,296,237 | B1 * | 10/2001 | Nagai | B60G 7/04 267/140 |
| 7,070,157 | B2 * | 7/2006 | Huprikar | F16F 1/37 248/560 |
| 8,123,203 | B2 | 2/2012 | Patil et al. | |
| 8,210,508 | B2 * | 7/2012 | Hwang | B60G 11/54 267/140.5 |
| 8,353,501 | B2 * | 1/2013 | Poppe | A47C 27/144 267/142 |
| 8,505,887 | B2 * | 8/2013 | Harden | B60G 11/52 267/220 |
| 8,720,921 | B1 * | 5/2014 | Lamberti | B60G 11/38 267/153 |
| 2004/0075204 | A1 * | 4/2004 | Heidemann | F16F 9/58 267/294 |
| 2005/0073166 | A1 * | 4/2005 | Snyder | B62D 24/02 296/35.1 |
| 2005/0230891 | A1 * | 10/2005 | Griffin | B60G 7/04 267/292 |
| 2006/0001205 | A1 * | 1/2006 | Raza | F16F 1/371 267/152 |
| 2006/0043659 | A1 * | 3/2006 | Gofron | B60G 7/04 267/220 |
| 2008/0012188 | A1 * | 1/2008 | Dickson | F16F 1/3732 267/139 |
| 2010/0213656 | A1 * | 8/2010 | Patil | B60G 11/54 267/220 |
| 2010/0230877 | A1 * | 9/2010 | Schudt | F16F 1/377 267/220 |
| 2012/0104672 | A1 | 5/2012 | Chervin et al. | |
| 2012/0193852 | A1 | 8/2012 | Thye-Moormann | |
| 2013/0119593 | A1 | 5/2013 | Konno et al. | |
| 2013/0193664 | A1 * | 8/2013 | Egolf | B60G 11/22 280/124.157 |
| 2015/0158363 | A1 * | 6/2015 | Patil | B60G 11/22 267/220 |

FOREIGN PATENT DOCUMENTS

| | | | | |
|---|---|---|---|---|
| DE | 102004019991 A1 * | 11/2005 | | B60G 11/24 |
| DE | 10 2005 030 528 A1 | 1/2007 | | |
| EP | 0 110 233 A2 | 6/1984 | | |
| FR | 1 229 796 A | 9/1960 | | |
| JP | S 59-110929 A | 6/1984 | | |
| JP | S 61-077505 A | 4/1986 | | |
| JP | 2010-526261 A | 7/2010 | | |
| JP | 2012-167704 A | 9/2012 | | |
| WO | WO 2012/021612 A1 | 2/2012 | | |

OTHER PUBLICATIONS

Machine-assisted English translation for FR 1 229 796 extracted from espacenet.com database on Apr. 14, 2016, 4 pages.
International Search Report for Application No. PCT/US2013/062983 dated Jan. 16, 2014, 3 pages.
Schudt, Joseph A. et al., "Dual Rate Jounce Bumper Design", SAE International, 2011-01-0791, Published Apr. 12, 2011, 7 pages.
English language abstract and machine-assisted English translation for CN 1789028 extracted from espacenet.com database on Apr. 15, 2015, 32 pages.
English language abstract and machine-assisted English translation for DE 10 2005 030 528 extracted from espacenet.com database on Apr. 15, 2015, 16 pages.
English language abstract for JPS 61-077505 extracted from espacenet.com database on Apr. 15, 2015, 2 pages.
English language abstract not found for JPS 59-110929; however, see English language equivalent EP 0 110 233. Original document extracted from espacenet.com database on Jul. 27, 2017, 4 pages.
English language abstract not found for JP 2010-526261; however, see English language equivalent U.S. 2012/0104672. Original document extracted from espacenet.com database on Jul. 27, 2017, 15 pages.
English language abstract for JP 2012-167704 extracted from espacenet.com database on Jul. 27, 2017, 1 page.

* cited by examiner

DAMPER

RELATED APPLICATIONS

Cross-Reference to Related Applications

This application is the National Stage of International Patent Application No. PCT/US2013/062983, filed on Oct. 2, 2103, which claims priority to and all advantages of U.S. Provisional Patent Application No. 61/708,738, which was filed on Oct. 2, 2012, and U.S. Provisional Patent Application No. 61/792,595, which was filed on Mar. 15, 2013, the disclosures of which are specifically incorporated by reference.

FIELD OF THE INVENTION

The present invention generally relates to a damper for use with a vehicle.

BACKGROUND OF THE INVENTION

Generally, a suspension system of a vehicle limits transmission of an impact force from tires to the frame of the vehicle. For example, when the vehicle travels over a bump, components of the suspension system jounce or collapse to absorb energy generated by the impact. However, when the suspension system cannot completely dissipate the energy, the components of the suspension system may impact each other thereby transmitting the forces to the frame, which is not desirable. Therefore, there is a need to prevent the components from impacting each other to prevent transmission of the remaining impact force from the tires to the frame of the vehicle.

SUMMARY OF THE INVENTION AND ADVANTAGES

A damper absorbs energy generated between a first component and a second component. The second component is spaced from and moveable toward the first component along a jounce axis. The damper includes a body having a ring-shaped configuration. The body also includes a first edge for engaging the first component and a second edge for engaging the second component. The second edge is spaced from the first edge. The body defines a plurality of holes spaced about the body. The plurality of holes are configured to allow the damper to compress axially for absorbing energy as one of the first and second components move along the jounce axis. Absorbing energy limits jounce travel and prevents the second component from directly impacting the first component, which can damage the components.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
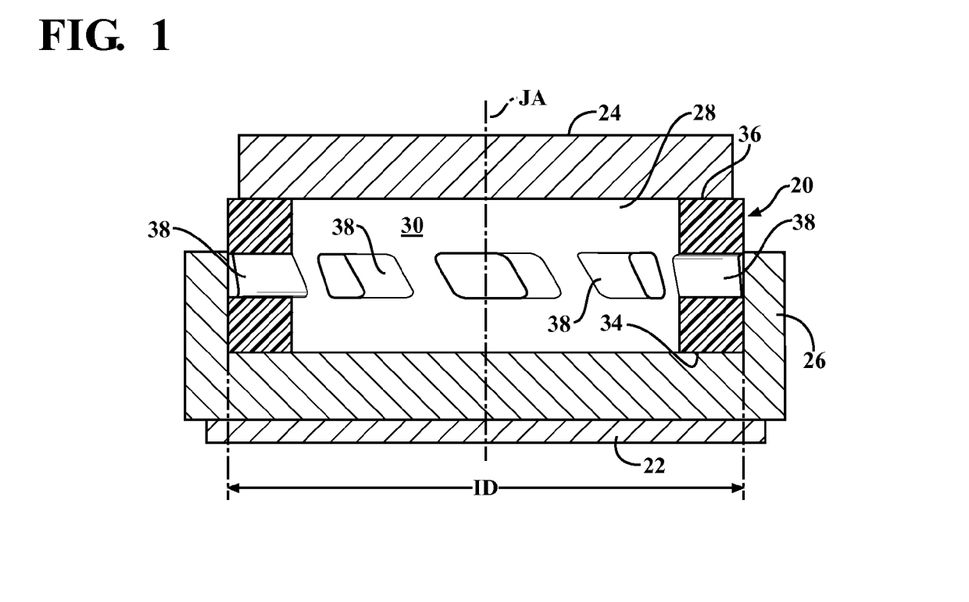
FIG. 1 is a cross-sectional view of a damper disposed between a first component and a second component.
Figure 2:
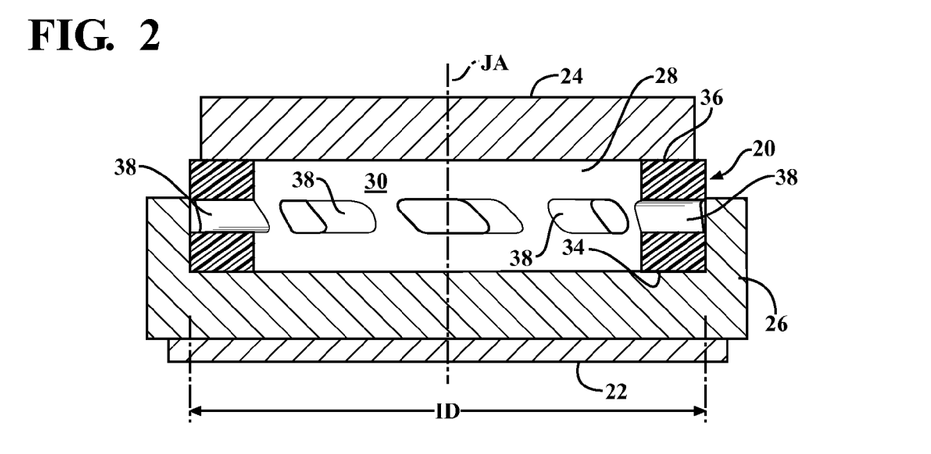
FIG. 2 is a cross-sectional view of the damper being compressed between the first and second components.

Referring to the Figures, wherein like numerals indicate like or corresponding parts throughout the several views, a damper is generally shown at 20. With reference to FIG. 1, the damper 20 is used between two components that move towards each other to prevent the components from directly impacting each other. Said differently, the damper 20 is an intermediate cushion between a first component 22 and a second component 24, which is movable toward the first component 22 along a jounce axis JA. As such, the damper 20 is compressed between the first and second components 22, 24 as the first and second components 22, 24 move toward each other, as shown in FIG. 2.

Typically, the first and second components 22, 24 are part of a vehicle, such as a truck or a car. As the vehicle travels over a bump or hits on obstruction, such as a curb, the second component 24 jounces toward the first component 22 as a result of an impact force applied to tires of the vehicle. If the impact force is large enough, the second component 24 may contact the first component 22, which can damage either the first and second components 22, 24 or other components of the vehicle. The damper 20 is positioned between the first and second components 22, 24 to absorb energy as one of the first and second components 22, 24 moves along a jounce axis JA toward each other prevent the second component 24 from directly impacting the first component 22. Absorbing energy as one of the first and second components 22, 24 moves along a jounce axis JA toward each other limits jounce travel and prevents the first and second components 22, 24 from directly impacting each other, which can damage the first and second components 22, 24.

Generally, the second component 24 is spaced from the first component 22. An attachment cup 26 may be coupled to the first component 22 with the second component 24 spaced from the attachment cup 26. The attachment cup 26 is aligned with the jounce axis JA such that the second component 24 is moveable toward the attachment cup 26 along the jounce axis JA. It is to be appreciated that the attachment cup 26 may be coupled to the first component 22 by any suitable method. For example, the attachment cup 26 may receive a fastener for coupling the attachment cup 26 to the first component 22.

Generally, the damper 20 is coupled to the first component 22. However, when the attachment cup 26 is present, the attachment cup 26 has a U-shaped configuration in cross-section for receiving the damper 20. As such, the damper 20 may be disposed within the attachment cup 26. It is to be appreciated that the damper 20 may be completely within the attachment cup 26. Alternatively, the damper 20 may only be partially within the attachment cup 26 such that a portion of the damper 20 extends from the attachment cup 26. The attachment cup 26 provides a housing for retaining the damper 20. As such, the attachment cup 26 couples the damper 20 to the first component 22.

Figure 3:
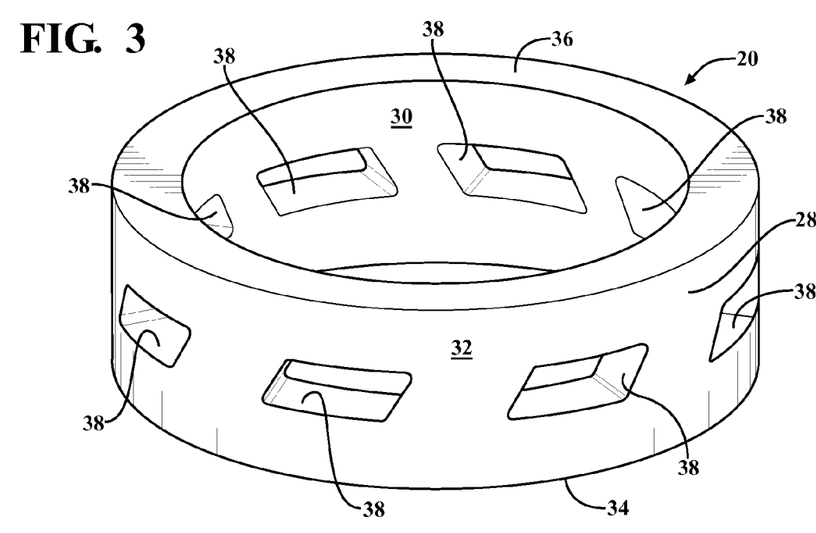
FIG. 3 is a perspective view of the damper having body defining a plurality of holes.

As shown in FIG. 3, the damper 20 comprises a body 28 having a ring-shaped configuration. The body 28 includes an interior surface 30, which may define a hollow interior to present the body 28 with the ring-shaped configuration. The body 28 includes an exterior surface 32 spaced from the interior surface 30. Typically, the damper 20 comprises an elastomeric material. Examples of suitable elastomeric materials for the damper 20 include block copolymers, such as polyurethanes, etheresters, styrols, and etheramides. Additional examples of suitable elatosmeric materials for the damper 20 include elastomer blends, such as cross-linked and/or non-cross-linked olefins.

The body 28 includes a first edge 34 for engaging the attachment cup 26. The body 28 also includes a second edge 36 for engaging the second component 24. The second edge 36 is spaced from the first edge 34. The body 28 defines a plurality of holes 38 spaced about the body 28 with the plurality of holes 38 configured to allow the damper 20 to compress axially for absorbing jounce between the first and second components 22, 24. When the interior and exterior surfaces 30, 32 are present as described above, the plurality of holes 38 are defined by the interior and exterior surfaces 30, 32. Said differently, the plurality of holes 38 are defined through the body 28 of the damper 20.

Generally, the plurality of holes 38 influences the compression of the damper 20. For example, the plurality of hole affect a stiffness of the damper 20. The stiffness of the damper 20 is directly related to an amount of travel the damper 20 will compress. Said differently, the stiffness of the damper 20 affects an amount of the impact force that is dampened by the damper 20 to prevent the entire impact force from being transferred to the first component 22. Therefore, increasing the number of holes 38 and changing a configuration of the holes 38 directly affects the stiffness of the damper 20. For example, increasing the number of holes 38 generally reduces the stiffness of the damper 20. Additionally, increasing a size of the holes 38 generally reduces the stiffness of the damper 20. Therefore, the stiffness of the damper 20 can be fine tuned by varying the number and size of the holes 38 in the body 28 of the damper 20. Generally, the stiffness of the damper 20 can be varied depending on the application the damper 20 is used in.

The damper 20 has an initial diameter ID. During compression, radial expansion of the damper 20 is limited because the plurality of holes 38 allows the body 28 to collapse upon itself rather than bulging. Therefore, the damper 20 can be positioned in tight spaces where radially expansion is not desirable. It is to be appreciated that the radial expansion of the damper 20 may be prevented all together such that the damper 20 does not expand radially when compressed.

Figure 4:
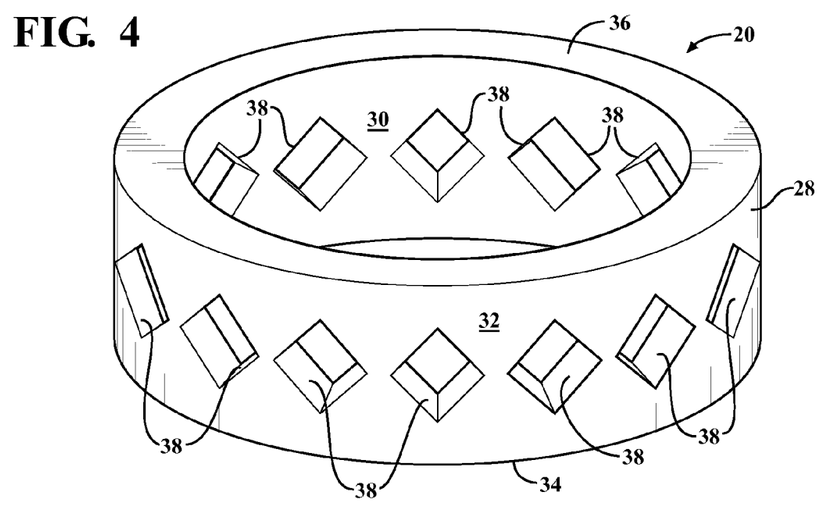
FIG. 4 is a perspective view of the damper with the plurality of holes having a rhomboidal configuration.
Figure 5:
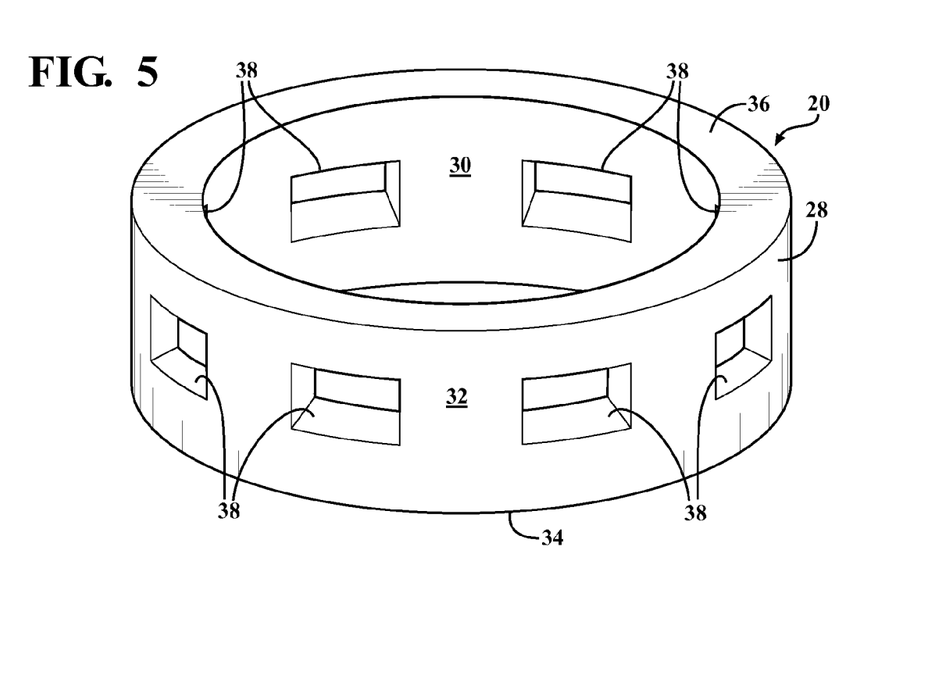
FIG. 5 is a perspective view of the damper with the plurality of holes having a rectangular configuration.
Figure 6:
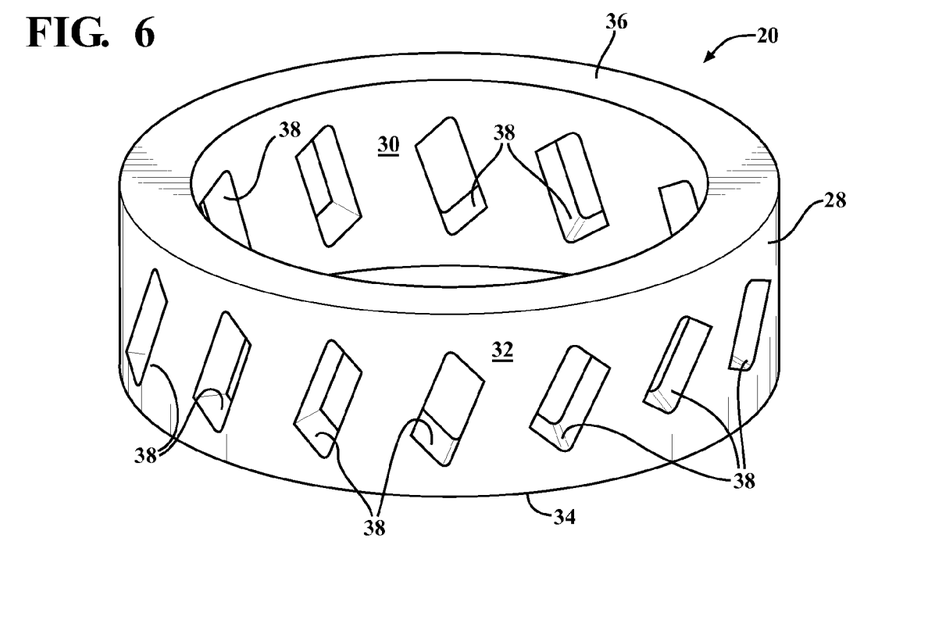
FIG. 6 is a perspective view of the damper with the plurality of holes extending parallel to a jounce axis.
Figure 7A:
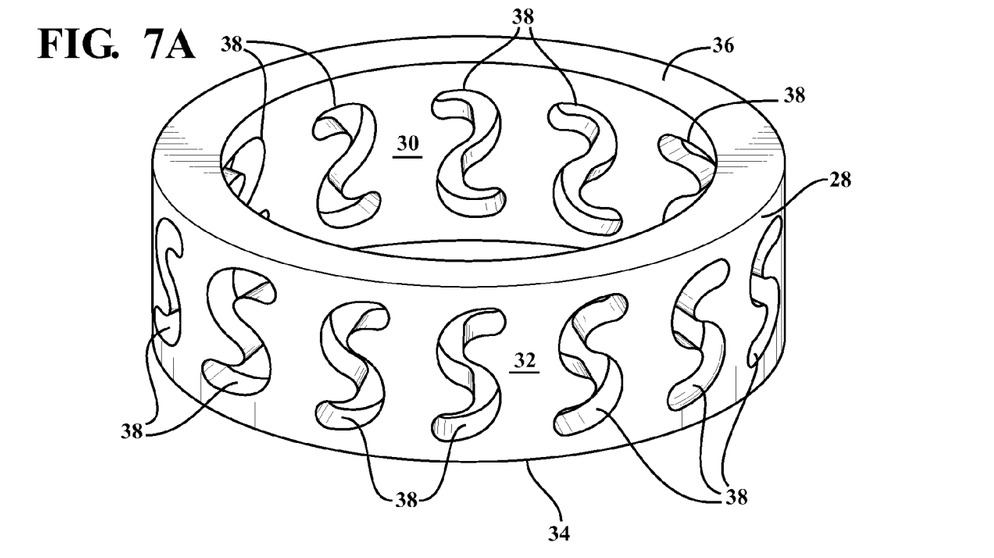
FIG. 7A is a perspective view of the damper with the plurality of holes having an S-shaped configuration.
Figure 7B:
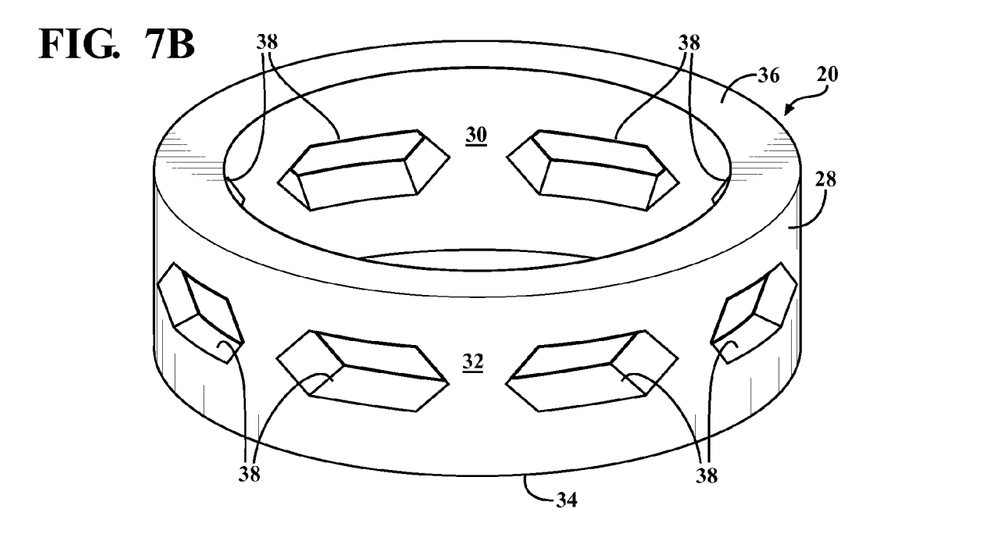
FIG. 7B is a perspective view of the damper with the plurality of holes having a hexagonal configuration.
Figure 7C:
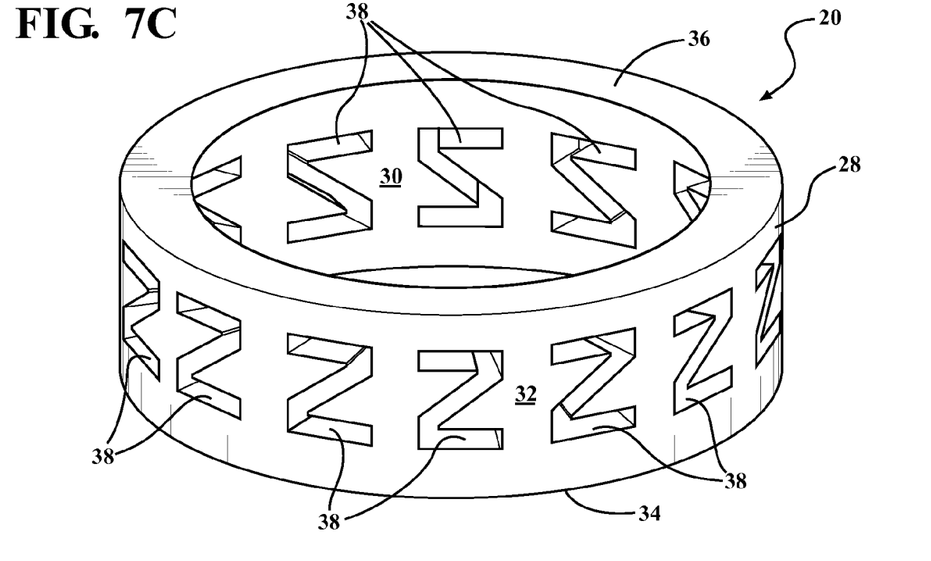
FIG. 7C is a perspective view of the damper with the plurality of holes having a Z-shaped configuration.

It is to be appreciated that the plurality of holes 38 may have any suitable configuration. For example, plurality of holes 38 may be parallelograms, as shown in FIG. 3. Additionally, the plurality of holes 38 may have a rhomboidal configuration, as shown in FIG. 4. Furthermore, the plurality of holes 38 may have a rectangular configuration, as shown in FIG. 5. It is to be appreciated that when the plurality of holes 38 are parallelograms, the plurality of holes 38 may extend about a perimeter of the body 28, as shown in FIG. 3, or the plurality of holes 38 may extend along a height of the damper 20, which is parallel with the jounce axis JA, as shown in FIG. 6. Additionally, when the plurality of holes 38 are parallelograms, the plurality of holes 38 may be rotated such that opposite corners of the parallelograms are aligned with the jounce axis JA, as shown in FIG. 6. Additionally, it is to be appreciated that the plurality of holes 38 may have a S-shaped configuration, as shown in FIG. 7A. Also, it is to be appreciated that the plurality of holes 38 may have a hexagonal configuration, as shown in FIG. 7B. Furthermore, it is to be appreciated that the plurality of holes 38 may have a Z-shaped configuration, as shown in FIG. 7C.

Figure 19:
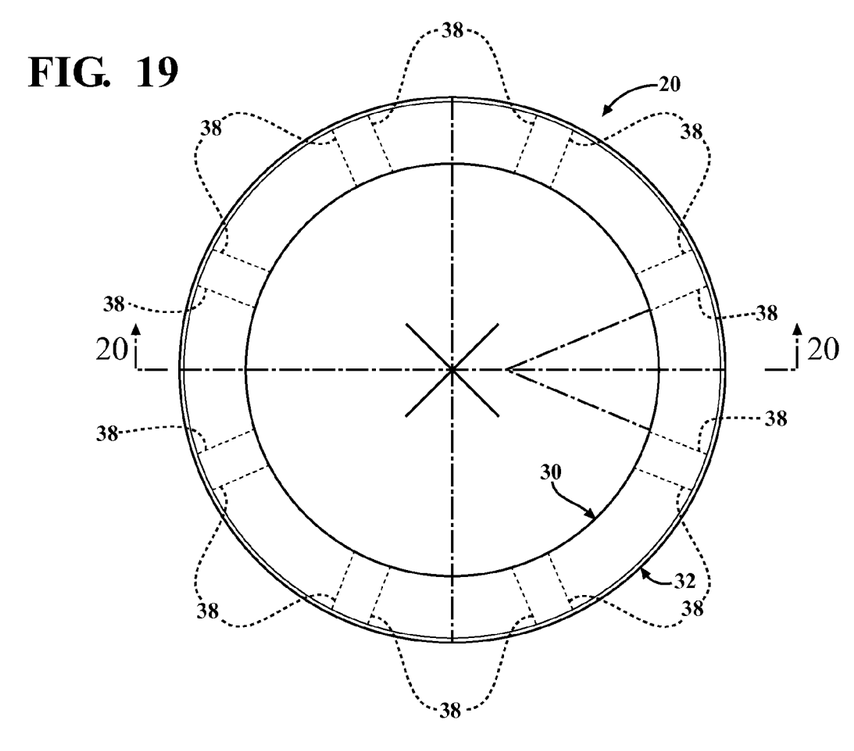
FIG. 19 is a cross-section view of the damper with the plurality of holes converging toward a center point of the damper.
Figure 20:
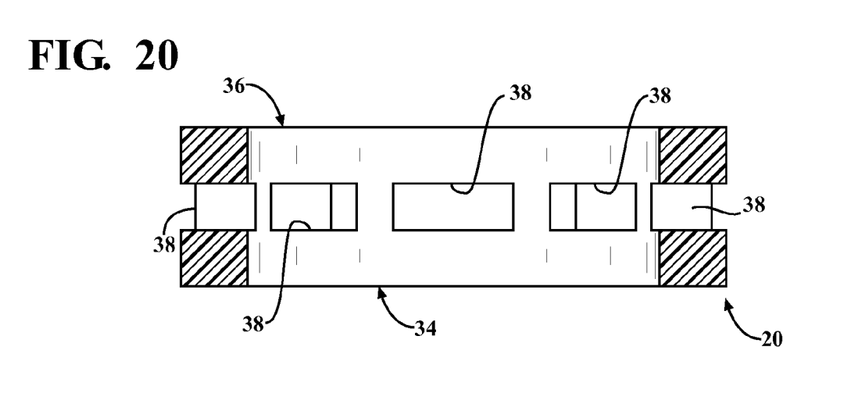
FIG. 20 is a cross-sectional view of the damper show the plurality of holes converging toward a center point of the damper.

With reference to FIGS. 19 and 20, it is to be appreciated that the plurality of holes 38 may converge toward a center point of the damper 20. Said differently, an area of plurality of holes 38 at the exterior surface 32 may be larger than an area of the plurality of holes 38 at the interior surface 30. Each of the plurality of holes 38 has a length L defined between the interior surface 30 and the exterior surface 32. It is to be appreciated that a height H and width W of each of the plurality of holes may decrease along the length L of the holes 38 moving from the exterior surface 32 toward the interior surface 30. Alternatively, the width W of the holes 38 may remain constant while only the height H decreases along the length L of the holes 38 moving from the exterior surface 32 toward the interior surface 30. As another alternative, the height H of the holes 38 may remain constant while only the width W decreases along the length L of the holes 38 moving from the exterior surface 32 toward the interior surface 30.

Figure 8:
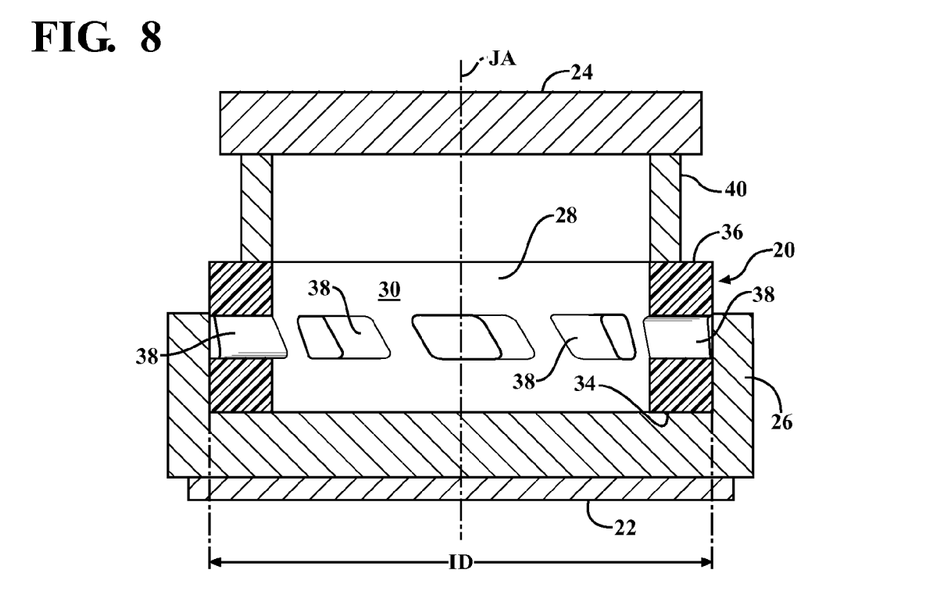
FIG. 8 is a cross-sectional view of the damper with the second component having a striker.

With reference to FIG. 8, the second component 24 may include a striker 40 movable with the second component 24 for compressing the damper 20 between the attachment cup 26 and the striker 40 as the second component 24 moves along the jounce axis JA toward the first component 22 for absorbing jounce between the first and second components 22, 24.

Figure 9:
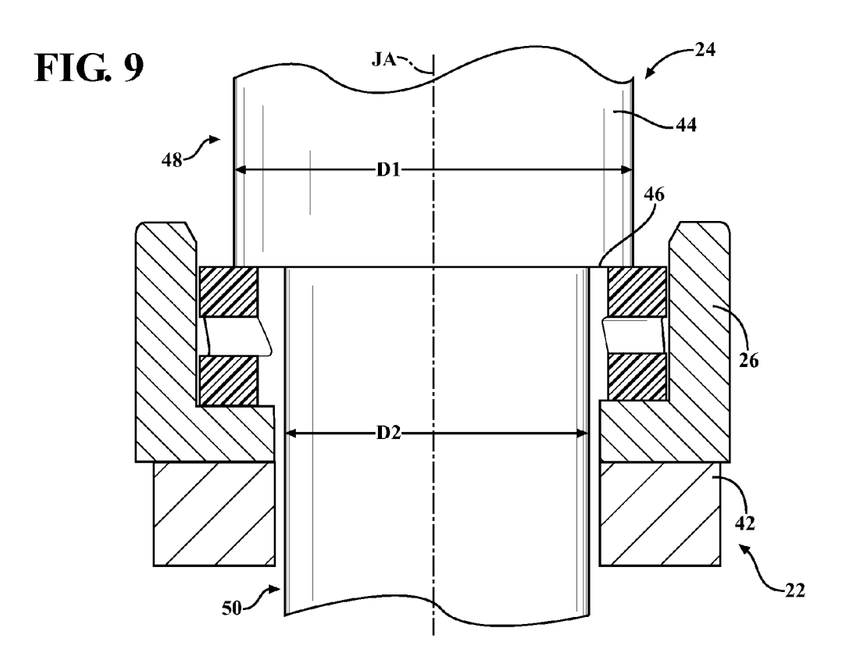
FIG. 9 is a cross-sectional view of the damper between an attachment cup and a rod having a step.
Figure 10:
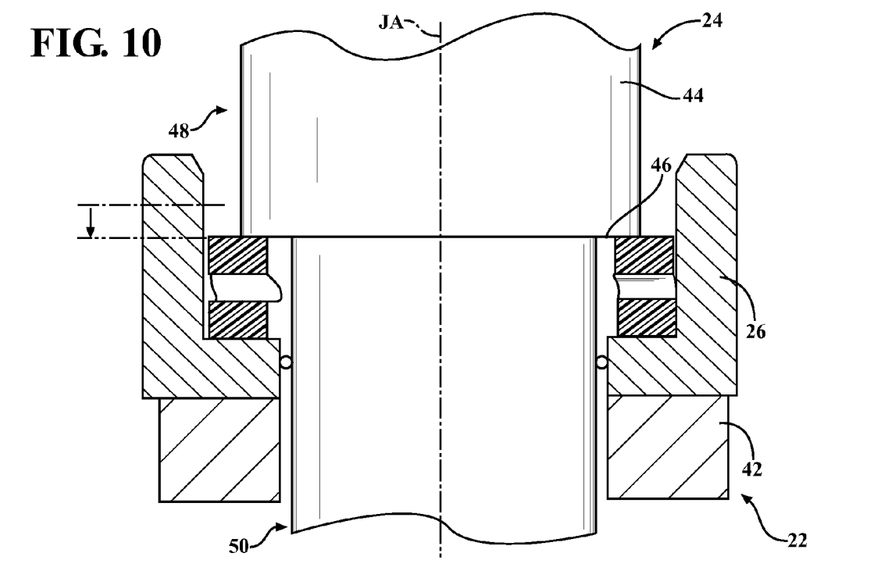
FIG. 10 is a cross-sectional view of the damper being compressed between the step of the rod and the attachment cup.
Figure 11:
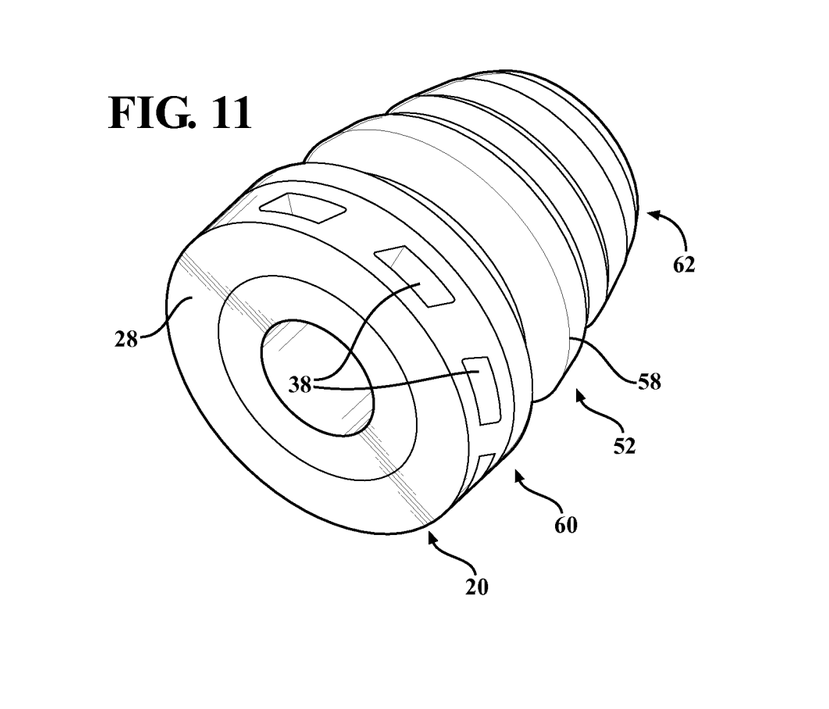
FIG. 11 is a perspective view of the damper coupled to a jounce bumper to form a dual-rate jounce bumper assembly.
Figure 12:
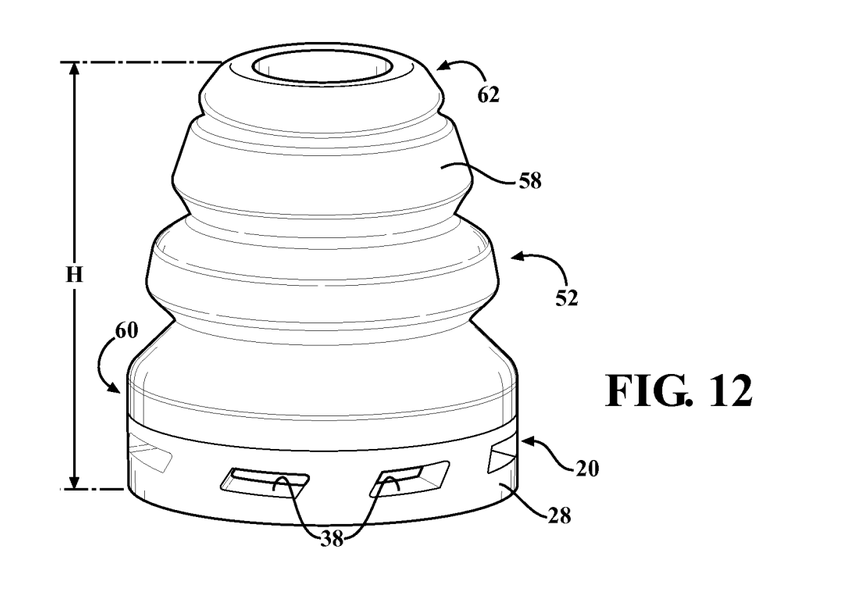
FIG. 12 is another perspective view of the damper coupled to the jounce bumper to form a dual-rate jounce bumper assembly.

In one embodiment shown in FIGS. 9 and 10, the damper 20 is used with a steering system of the vehicle. For example, the first component 22 may be a gear housing 42 and the second component 24 may be rod 44 extending from the gear housing 42 to translate rotation of a steering wheel to movement of the tires of the vehicle. In such an embodiment, the attachment cup 26 is coupled to the gear housing 42. It is to be appreciated that the attachment cup 26 may be an integral component of the gear housing. The second component 24 has a cylindrical configuration and extends into the attachment cup 26 for compressing the damper 20 within the attachment cup 26 as the second component 24 moves along the jounce axis JA toward the first component 22. The second component 24 may have a step 46 such that the second component 24 has a first portion 48 having a first diameter D1 and a second portion 50 having a second diameter D2 that is smaller than the first diameter D1 of the first portion 48 to define the step 46. When present, the second portion 50 of the second component 24 is disposed through the hollow interior of the damper 20 such that the damper 20 is compressed between the attachment cup 26 and the step 46 of the second component 24 as the second component 24 moves along the jounce axis JA toward the first component 22.

As introduced above, when the vehicle hits an obstruction, such as the curb, the impact force is generated. In this case, the impact force may be a lateral force which results in the rod 44, which is the second component 24, being forced into the gear housing 42, which is the first component 22. The step 46 of the second component 24 contacts the damper 20 in the attachment cup 26, as shown in FIG. 9. The step 46 of the second component 24 then compresses the damper 20 thereby allowing the damper 20 to absorb the impact force or jounce that resulting from the vehicle hitting the object.

In another embodiment shown in FIGS. 11-18, the damper 20 may be used with a jounce bumper to provide a dual-rate jounce bumper assembly 52 for managing the energy generated from the impact force. The dual-rate jounce bumper assembly 52 absorbs energy between the first component 22 and the second component 24. In such an embodiment, the first component 22 is typically a frame 54 of the vehicle and the second component 24 is a strut assembly 56, which is part of a suspension system of the vehicle. It is to be appreciated that the first component 22 may alternatively be a shock mount of the suspension system.

The dual-rate jounce bumper assembly 52 includes a bumper 58 having a first end 60 disposed within the attachment cup 26 and a second end 62 spaced from the first end 60 for contacting the second component 24 as the second component 24 moves along the jounce axis JA toward the first component 22. The damper 20 is disposed on the first end 60 of the bumper 58 within the attachment cup 26. In operation, the bumper 58 is compressed first to absorb jounce between the first and second components 22, 24. Said differently, the bumper 58 compresses first to stifle shock and protect the first and second components 22, 24. If the force is large enough, such that the bumper 58 is compressed to a predetermined value, the damper 20 is then compressed to absorb and dampen any remaining force between the first and second components 22, 24. Said differently, the stiffness of the damper 20, as described above, is greater than a stiffness of the bumper 58 such that the bumper 58 compresses first before the damper 20 is compressed. Typically, the bumper 58 comprises microcellular urethane and the damper 20 comprises the thermoplastic polyurethane.

It is to be appreciated that the second component 24 may include the striker 40 aligned with the jounce axis JA such that the striker 40 contacts the bumper 58 for compressing the bumper 58 and then the damper 20.

Figure 13:
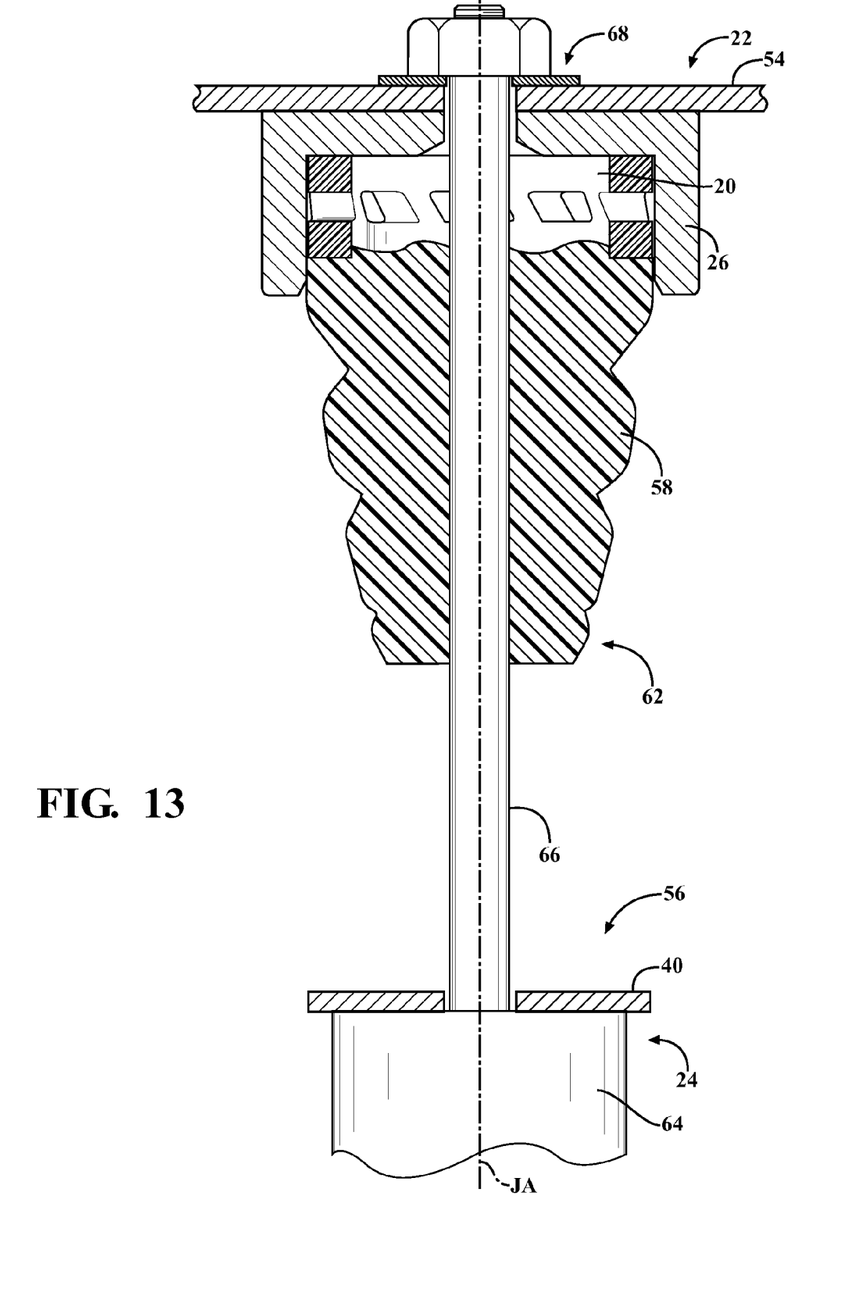
FIG. 13 is a cross-sectional view of a strut assembly coupled to a frame of a vehicle with the dual-rate jounce bumper assembly coupled to the strut assembly.

FIG. 13 shows the dual-rate jounce bumper assembly 52 coupled to the strut assembly 56. As shown, the damper 20 and the bumper 58 define a height H of the dual-rate jounce bumper assembly 52. The strut assembly 56 includes a cylinder 64, which is the second component 24 described above, and a piston rod 66 displaceable relative to the cylinder 64 along the jounce axis JA. An end 68 of the piston rod 66 is coupled to the frame 54 for coupling the suspension system to the frame 54 of the vehicle. The dual-rate jounce bumper assembly 52 is aligned with the jounce axis JA to ensure the cylinder 64 contacts the dual-rate jounce bumper assembly 52 as the piston rod 66 collapses into the cylinder 64 to allow the dual-rate jounce bumper assembly 52 to absorb the impact force. The piston rod 66 extends through the dual-rate jounce bumper assembly 52.

Figure 14:
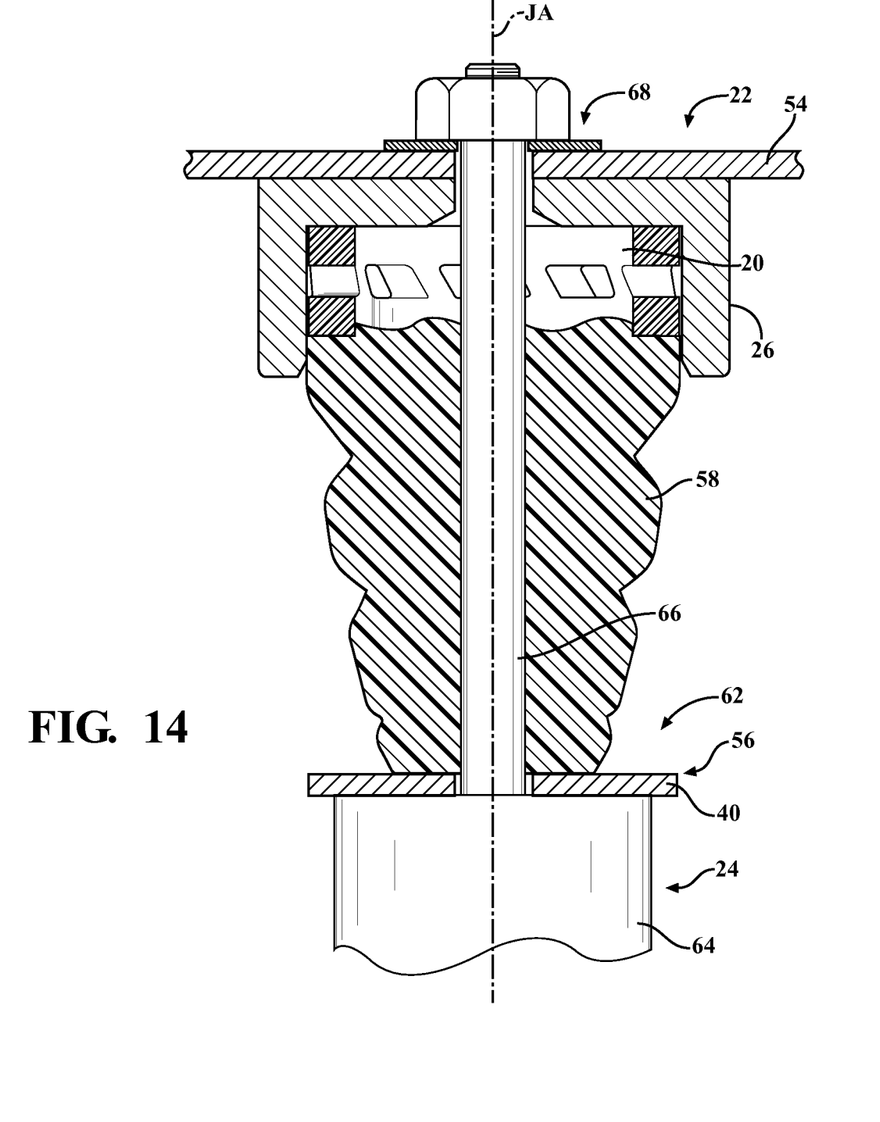
FIG. 14 is a cross-sectional view of a cylinder of the strut assembly contacting a bumper of the dual-rate jounce bumper assembly.
Figure 15:
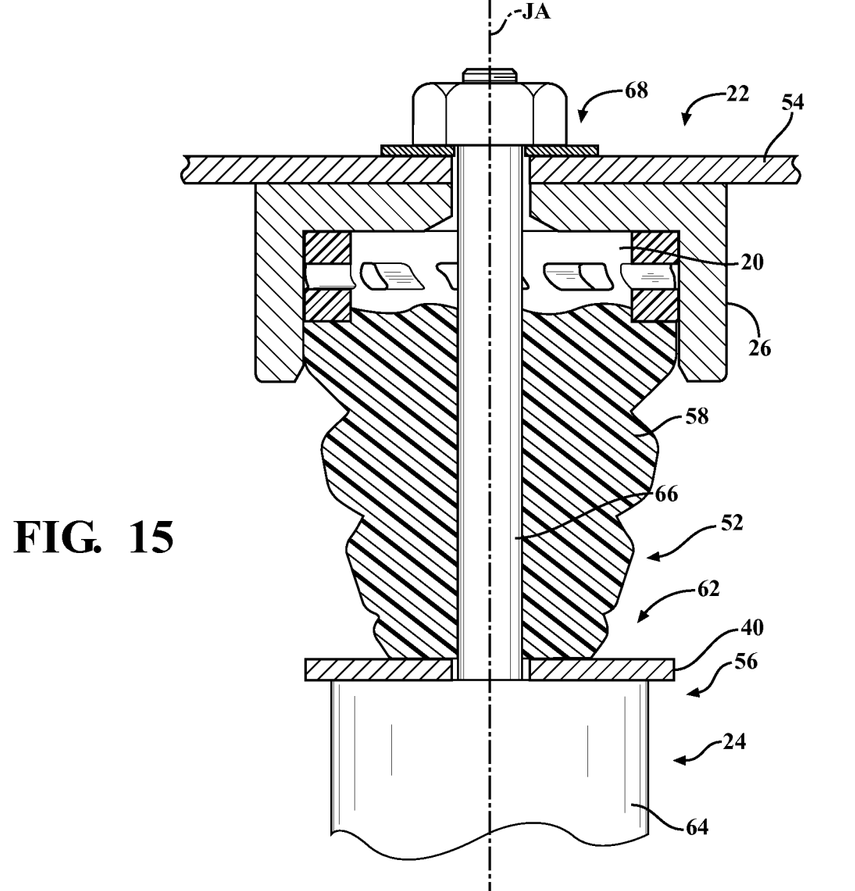
FIG. 15 is a cross-sectional view of the cylinder of the strut assembly compressing the bumper of the dual-rate jounce bumper assembly.
Figure 16:
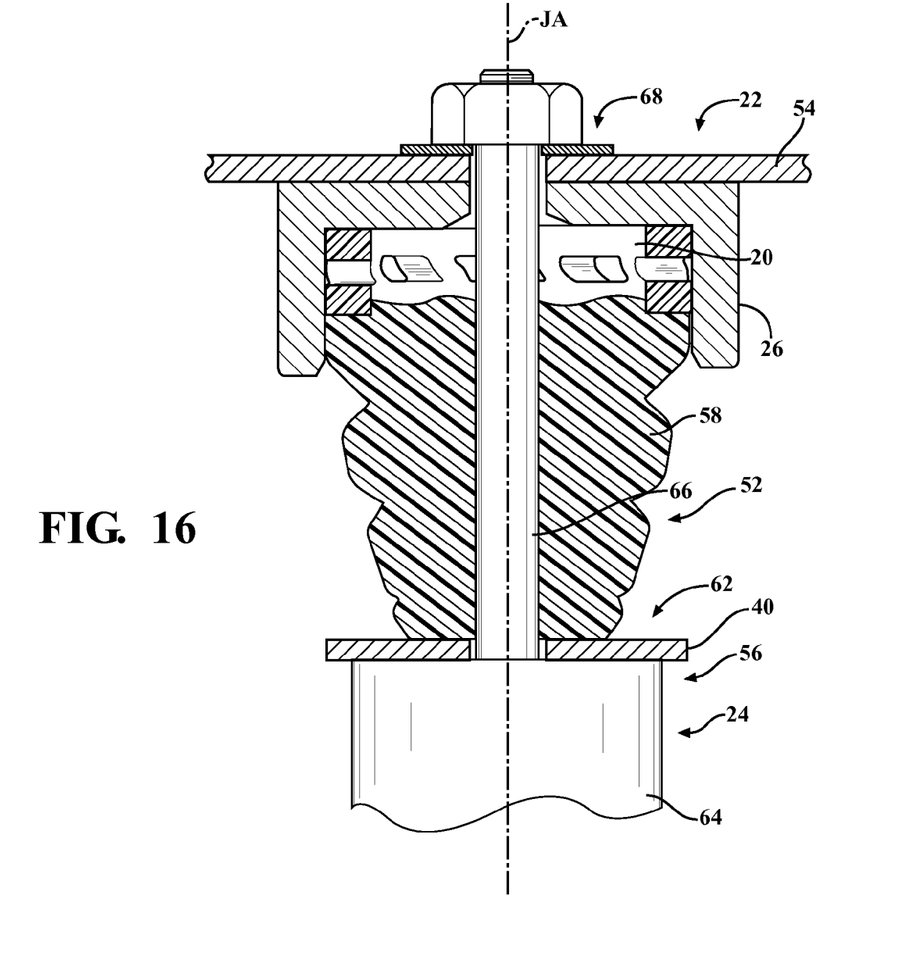
FIG. 16 is a cross-sectional view of the cylinder of the strut assembly compressing the bumper and the damper of the dual-rate jounce bumper assembly.

As introduced above, when the vehicle travels over a bump, the impact force is generated. If the impact force is greater than the suspension system can absorb, the components of the suspension system, such as the cylinder 64 of the strut assembly 56 contacts the bumper 58, as shown in FIG. 14. The cylinder 64 then compresses the bumper 58, as shown in FIG. 15. The greater the impact force, the greater the compression of the bumper 58. Once the bumper 58 is compressed to the predetermined value, the damper 20 is then compressed to absorb remaining jounce between the first and second components 22, 24, as shown in FIG. 16.

Figure 17:
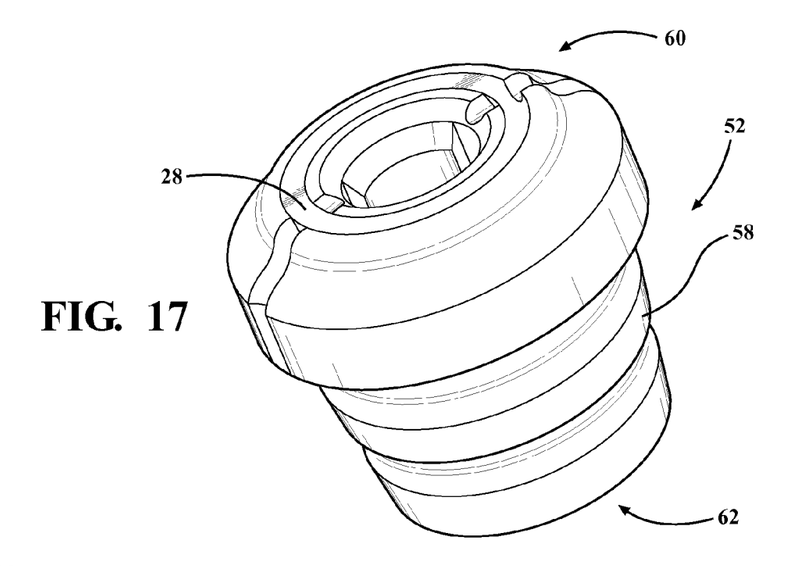
FIG. 17 is a perspective view of the dual-rate jounce bumper having the damper embedded within the bumper.
Figure 18:
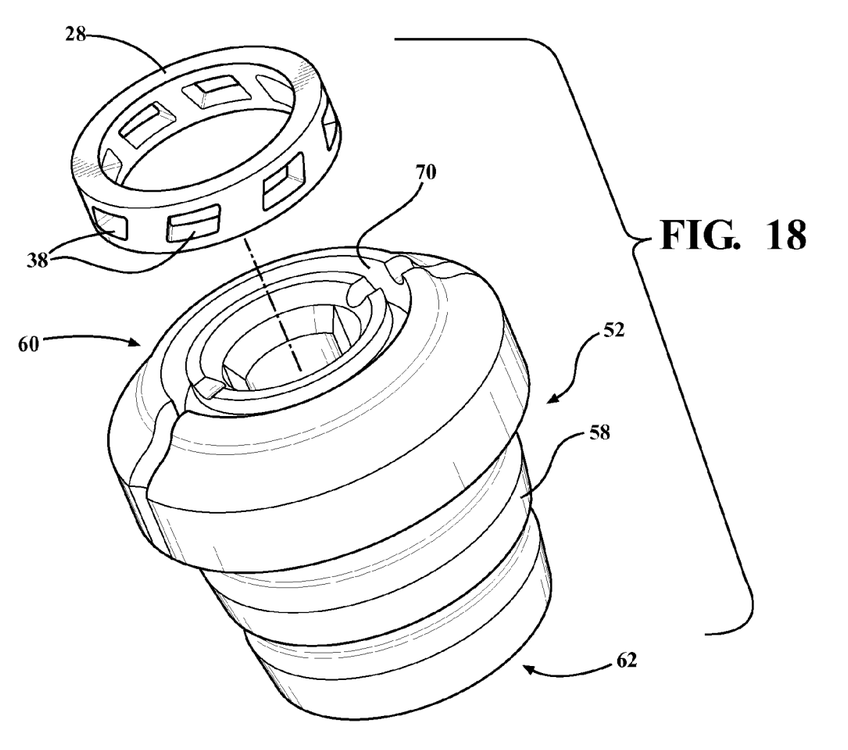
FIG. 18 is an exploded perspective view of the dual-rate jounce bumper of FIG. 17 showing the damper spaced from the bumper.

With reference to FIGS. 17 and 18, the damper 20 may be embedded within the bumper 58. For example, the bumper 58 may define a pocket 70 for receiving the damper 20. Placing the damper 20 within the pocket 70 allows dual-rate jounce bumper assembly 52 to take up a smaller area, to fit within the attachment cup 26, and conform with the geometry of the bumper 58. Typically, the first end 60 of the bumper 58 defines the pocket 70. However, it is to be appreciated that any portion of the bumper 58 may define the pocket 70. It is also to be appreciated that the pocket 70 can be formed in the bumper 58 by any suitable method. For example, the pocket 70 can be formed at the time of molding the bumper 58. Alternatively, the pocket 70 can be formed after the bumper 58 is formed by removal material for the bumper 58.

It is to be appreciated that the damper 20 may be completely embedded within the bumper 58 such that the damper 20 does not extend from the bumper 58. Alternatively, the damper 20 may be completely disposed within the pocket 70 such that the damper 20 does not extend from the bumper 58. It is also to be appreciated that the pocket 70 may completely surround the damper 20 such that the damper is not visible when the dual-rate jounce bumper assembly 52 is viewed. As such, it is to be appreciated that the bumper 58 may be formed with the damper 30 present such that the bumper 58 is formed around the damper 20.

It is to be appreciated that although the dual-rate jounce bumper assembly 52 has been described in connection with a strut assembly 56, the dual-rate jounce bumper assembly 52 can be used with other components of the suspension system, such as shocks. It is also to be appreciated that the dual-rate jounce bumper assembly 52 may be used with components other than those of the suspension system.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention may only be determined by studying the following claims.

What is claimed is:

1. A damper for absorbing energy between a first component and a second component with the second component spaced from and moveable toward the first component along a jounce axis, said damper comprising a body having a ring-shaped configuration about a center point and including a first edge for engaging the first component and a second edge for engaging the second component with said second edge spaced from said first edge and with said body defining a plurality of holes spaced about said body wherein each of said holes converge toward said center point of said damper with said plurality of holes configured to allow said damper to compress axially for absorbing energy as one of the first and second components moves along the jounce axis,
wherein said body has an exterior surface and an interior surface opposite said exterior surface, and wherein an area of each of said holes at said exterior surface is larger than an area of each of said holes at said interior surface.

2. A damper as set forth in claim 1 wherein said body includes an interior surface defining a hollow interior to present said body with said ring-shaped configuration and said body includes an exterior surface spaced from said interior surface with said plurality of holes defined by said interior and exterior surfaces.

3. A damper as set forth in claim 1 wherein each of said holes have a circular configuration.

4. A damper as set forth in claim 1 wherein each of said holes have a trapezoidal configuration.

5. A damper as set forth in claim 1 wherein each of said holes have a rhomboidal configuration.

6. A damper as set forth in claim 1 wherein each of said holes have a rectangular configuration.

7. A damper as set forth in claim 1 wherein said body comprises an elastomeric material.

8. A damper as set forth in claim 1 wherein each of said holes has a length defined between said exterior surface and said interior surface, with a height and/or width of each of said holes decreasing along said length of said holes from said exterior surface to said interior surface.

9. A dual-rate jounce bumper assembly for absorbing energy between a first component and a second component of a vehicle with the second component spaced from and movable toward the first component along a jounce axis, said dual-rate jounce bumper assembly comprising:
a bumper having a first end adapted to be coupled to the first component and a second end spaced from said first end adapted to contact the second component as the second component moves along the jounce axis toward the first component, with said bumper compressible axially for absorbing energy as one of the first and second components moves along the jounce axis; and
a damper disposed on said first end of said bumper, said damper comprising;
a body having a ring-shaped configuration and including a first edge adapted to engage the first component and a second edge adapted to engage the second component with said second edge spaced from said first edge and with said body defining a plurality of holes spaced about said body with said plurality of holes configured to allow said damper to compress axially for absorbing energy as one of the first and second components moves along said jounce axis;
wherein said damper has a stiffness that is greater than a stiffness of said bumper such that said bumper is compressible to a predetermined value by the second member before said damper is compressed to absorbing energy between the first and second components, and
wherein said bumper defines a pocket for receiving said damper such that said damper is embedded within said bumper.

10. A dual-rate jounce bumper assembly as set forth in claim 9 wherein said bumper comprises microcellular urethane.

11. A dual-rate jounce bumper assembly as set forth claim 9 wherein said damper comprises an elastomeric material.

12. A dual-rate jounce bumper assembly as set forth in claim 9 wherein said body of said damper includes an interior surface defining a hollow interior to present said body with said ring-shaped configuration and said body includes an exterior surface spaced from said interior surface with said plurality of holes defined by said interior and exterior surfaces.

13. A suspension system for a vehicle comprising:
a first component;
a second component spaced from and movable toward said first component along a jounce axis; and
a dual-rate jounce bumper assembly for absorbing energy between said first and second components with said dual-rate jounce bumper assembly comprising;
a bumper having a first end coupled to said first component and a second end spaced from said first end for contacting said second component as said second component moves along said jounce axis toward said first component, with said bumper compressible axially for absorbing energy as one of said first and second components moves along said jounce axis, and
a damper disposed on said first end of said bumper, with said damper comprising,
a body having a ring-shaped configuration and including a first edge for engaging said first component and a second edge for engaging said second component with said second edge spaced from said first edge and with said body defining a plurality of holes spaced about said body with said plurality of holes configured to allow said damper to compress axially for absorbing energy as one of said first and second components moves along said jounce axis;
wherein said damper has a stiffness that is greater than a stiffness of said bumper such that said bumper is compressible to a predetermined value by said second member before said damper is compressed to absorbing jounce between the first component and said second component, and
wherein said bumper defines a pocket for receiving said damper such that said damper is embedded within said bumper.

14. A suspension system as set forth in claim 13 wherein said bumper comprises microcellular urethane.

15. A suspension system as set forth in claim 13 wherein said damper comprises an elastomeric material.

16. A suspension system as set forth in claim 13 wherein said body of said damper includes an interior surface defining a hollow interior to present said body with said ring-shaped configuration and said body includes an exterior surface spaced from said interior surface with said plurality of holes defined by said interior and exterior surfaces.

17. A suspension system as set forth in claim 13 wherein said damper does not expand radially.

* * * * *